F. GUNDORPH.
RELEASING MECHANISM.
APPLICATION FILED AUG. 17, 1908.
919,716.
Patented Apr. 27, 1909.
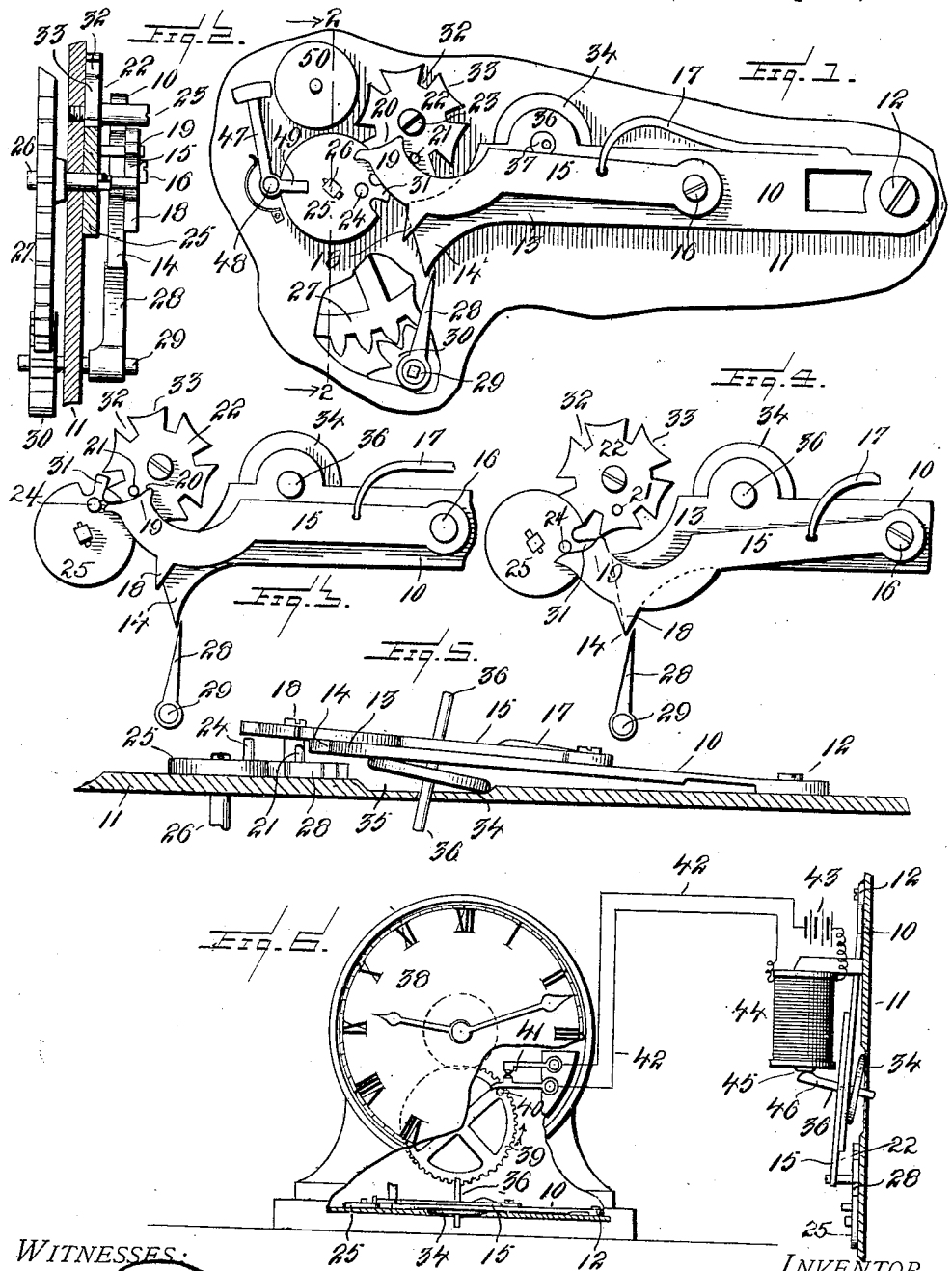
WITNESSES:
INVENTOR
Ferdinand Gundorph
BY
E. B. Stocking
Attorney

UNITED STATES PATENT OFFICE.

FERDINAND GUNDORPH, OF PORTLAND, OREGON.

RELEASING MECHANISM.

No. 919,716.  Specification of Letters Patent.  Patented April 27, 1909.

Application filed August 17, 1908. Serial No. 448,969.

*To all whom it may concern:*

Be it known that I, FERDINAND GUNDORPH, citizen of the United States, residing at Portland, county of Multnomah, and State of Oregon, have invented certain new and useful Improvements in Releasing Mechanism, of which the following is a specification, reference being had therein to the accompanying drawing.

This invention relates to a releasing mechanism, and is particularly adapted to control the intermittent movement of power actuated members.

The invention has for an object to provide a spring plate provided with a detent or dog adapted to engage and hold a power mechanism together with a controlling wheel having a stop pin by which the detent is forced into holding position together with means for releasing the parts to permit the desired period of rotation which is automatically stopped.

Other and further objects and advantages of the invention will be hereinafter fully set forth and the novel features thereof defined by the appended claims.

In the drawings:—Figure 1 is an elevation of the invention; Fig. 2 is a section on line 2—2, Fig. 1; Figs. 3 and 4 are diagrams showing different positions of the parts; Fig. 5 is a section showing the parts in bottom plan; Fig. 6 is a diagram showing an application of the invention.

Like numerals refer to like parts in the several views of the drawing.

The invention is adapted for application to any character of mechanism, but for the purpose of illustration, is here shown as assembled in relation to a time mechanism. The releasing mechanism comprises the spring plate 10 secured to a frame plate 11 at its end 12 so that the opposite free end 13 of the spring plate may move toward and from the frame plate. This end is provided with a dog 14 which normally bears in contact with the plate 11. Upon the outer face of the spring plate a detent 15 is mounted by pivot 16 and normally held in its raised position by a spring 17 which may be integral with the plate, as shown in Fig. 1, or otherwise applied. The free end of the detent is provided with a dog 18 and is extended upward therefrom to form an operating nose 19 upon one end thereof, having a step face 20. This nose is adapted to coöperate with a pin 21 carried by the controlling wheel 22, which is pivotally mounted on the frame plate 11 at 23 and extended into the path of the detent. This pin 21 engages the nose 19 and forces the detent away from the pivot 23 with which it normally contacts, so as to move the face 20 of the detent into the path of the stop pin 24 carried upon the disk 25 which is secured upon the power shaft 26 of the operating gear 27.

The pin 24 in the travel of the disk forces the detent downward so that the dog 18 thereof comes into alinement with the dog 14, as shown in Fig. 4, and also into the path of the fly arm or lever 28 secured to the shaft 29 of the gear 30 and stop the rotation of said fly arm. The disk 25 is provided with the tooth 31 adapted to seat in the spaced recesses 32 disposed intermediate of the curved faces 33 upon the wheel 22. By this means a complete rotation of the disk 25 is required to move the wheel 22 one step forward, and the number of rotations or the extent of movement of the wheel is determined by the number of spaced recesses therein, which may be varied or arranged to secure the predetermined intervals of movement desired. The fly arm 28 is disposed in a plane parallel to but beyond the dog 14 when in contact with the plate 11 and is not engaged by said dog until the dog be moved out of contact with the frame plate, Figs. 2 and 5. This movement may be secured by any desired device contacting with the spring plate 10 to move it away from the frame plate 11. The form here shown comprises a disk 34 mounted in a recess 35 in the frame plate and provided with an extended shaft 36 passing through an aperture in said plate and also through an enlarged aperture 37 in the spring plate so as to permit a swing or oscillation of the shaft for the purpose of tilting the disk by a lever action into contact with the spring 10 and thus moving it away from the frame plate, as shown in Fig. 5, so that it lies in the path of the fly 28.

While the invention may be used for the control of any desired mechanism, and is also adapted to be operated by any preferred means, it is here shown as operated by a time mechanism 38 which is suitably geared to a wheel 39 provided with a pin or projection 40 disposed to travel into contact with the shaft 36 of the disk so as to tilt the latter once in each rotation of the wheel. The releasing mechanism in this instance is disposed at the base of the time mechanism to control any desired part or device. This projection 40 in its rotation also engages the contacts 41 carried by the lines 42 which extend to the battery 43 and electro magnet 44. These contacts when closed energize the core 45 of this magnet causing it to attract the armature 46 carried on the stem 36 of the disk 34 thereby releasing any mechanism controlled at that point.

Two means have been herein shown for tilting the disk which contacts with the spring plate and causes the release of the fly, but other devices may be used for this purpose, or the shaft may be tilted by hand or moved longitudinally of its axis by hand or any suitable connection so as to secure the function of moving the plate 10 laterally to bring its dog 14 into the path of the fly and retain the latter against rotation. As shown in Fig. 5 the shaft of the disk may be extended in opposite directions therefrom so as to dispose it in the most convenient position for operation.

As illustrating one form of device to be controlled by this releasing mechanism through direct connection therewith a bell ringing mechanism is shown in Fig. 1 in which the hammer 47 is pivotally mounted at 48 and provided with an angle arm 49 disposed in the path of travel of the pin 24 upon the disk 25. In the rotation of this disk the hammer is moved by contact of the pin away from the bell 50 and when released strikes the bell.

In the operation of the invention the parts are normally in the position shown in Fig. 4, where the dog 14 is in contact with the frame plate, and the dog 18 depressed into the path of the fly arm 28 holds the parts against movement. The operation of the actuating means, shifting the spring plate away from the frame plate causes the dog 18 to move out of contact with the arm 28 and brings the dog 14 of the spring plate into contact with said arm so that it will be still held. This movement releases the nose of the detent away from the pin 24 on the disk 25 and allows the spring 17 to restore the detent to its raised position, while the dog 14 of the spring plate still holds the fly arm (Fig. 3). So long as pressure is applied to this plate, the parts are still held against movement, but as soon as the pressure is removed, the plate 10 returns to its initial position releasing the fly arm which starts its rotation to carry the tooth 31 of the disk 25 into mesh with the wheel 22 and to rotate it until a pin 21 thereon engages the nose 19 of the detent and forces the same away from the pivot of the wheel and into the path of the pin 24 so that the latter in its travel carries the detent downward against the tension of the spring until it engages and stops the fly arm leaving all of the parts in their initial position ready for a similar subsequent operation.

In the return movement of the detent the spring causes it to rise until it engages the extended end of the pivot 23 which acts as a stop until the pin is brought into engaging relation.

The invention therefore presents a simple, efficient and economically constructed form of releasing mechanism adapted for positive automatic operation in any class of machine where an intermittent motion of predetermined periodicity is desired. Various means may therefore be used for actuating the spring plate in its movement relative to the fly arm.

Having described my invention and set forth its merits, what I claim and desire to secure by Letters Patent is:—

1. In a releasing mechanism, a driving shaft provided with a traveling arm, a spring plate mounted for movement laterally of said arm, a pivoted detent upon said plate, and means for moving said detent toward said arm.

2. In a releasing mechanism, a driving shaft provided with a traveling arm, a spring plate mounted for movement laterally of said arm, a pivoted detent upon said plate, and a controlling wheel provided with a projection to engage and move said detent.

3. In a releasing mechanism, a driving shaft provided with a traveling arm, a spring plate mounted for movement laterally of said arm, a pivoted detent upon said plate, a controlling wheel provided with a projection to engage and move said detent, and a spring adapted to shift said detent from said arm.

4. In a releasing mechanism, a driving shaft provided with a traveling arm, a spring plate mounted for movement laterally of said arm, a pivoted detent upon said plate, a controlling wheel provided with a projection to engage and move said detent, a spring adapted to shift said detent from said arm, and a connection geared to said driving shaft and provided with means to engage and shift said detent.

5. In a releasing mechanism, a driving shaft provided with a traveling arm, a spring plate mounted for movement laterally of said arm, a pivoted detent upon said plate, a controlling wheel provided with a projection to engage and move said detent, a spring adapted to shift said detent from said arm, a connection geared to said driving shaft and provided with means to engage and shift said detent, and means carried by said connection for operating said wheel.

6. In a releasing mechanism, a driving shaft provided with a traveling arm, a spring plate mounted for movement laterally of said arm, a pivoted detent upon said plate, a controlling wheel provided with a projection to engage and move said detent, a spring adapted to shift said detent from said arm, a disk geared to said driving shaft and provided with means to engage and shift said detent, means carried by said disk for operating said wheel, a dog carried by said spring to engage said arm, and a coöperating parallel dog carried by said detent.

7. In a releasing mechanism, a driving shaft provided with a holding arm, a spring plate provided with a dog disposed out of the path of travel of said arm, a detent carried by said plate and provided with a dog disposed in the path of travel of said arm, and means for shifting said spring dog laterally of the arm.

8. In a releasing mechanism, a driving shaft provided with a holding arm, a spring plate provided with a dog disposed out of the path of travel of said arm, a detent carried by said plate and provided with a dog disposed in the path of travel of said arm, means for shifting said spring dog laterally of the arm, and means for shifting said detent to bring said dogs into alinement.

9. In a releasing mechanism, a driving shaft provided with a holding arm, a spring plate provided with a dog disposed out of the path of travel of said arm, a detent carried by said plate and provided with a dog disposed in the path of travel of said arm, means for shifting said spring dog laterally of the arm, an operating nose carried by said detent, and a controlling wheel provided with a pin to engage said detent.

10. In a releasing mechanism, a driving shaft provided with a holding arm, a spring plate provided with a dog disposed out of the path of travel of said arm, a detent carried be said plate and provided with a dog disposed in the path of travel of said arm, means for shifting said spring dog laterally of the arm, an operating nose carried by said detent, a disk driven from the power shaft and provided with a pin adapted to engage said detent, a controlling wheel operable from said disk, and a projection from the controlling wheel adapted to shift said detent into the path of the projection upon said disk.

11. In a releasing mechanism, a driving shaft provided with a holding projection, a spring plate adapted to engage said projection, a detent pivotally mounted upon said plate, a spring for normally retaining said detent in holding position, and a coöperating dog carried by said detent.

12. In a releasing mechanism, a driving shaft provided with a holding projection, a spring plate adapted to engage said projection, a detent pivotally mounted upon said plate, a spring for normally retaining said detent in holding position, a coöperating dog carried by said detent, and a lever device adapted to laterally shift said spring and detent.

13. In a releasing mechanism, a driving shaft provided with a holding projection, a spring plate adapted to engage said projection, a detent pivotally mounted upon said plate, a spring for normally retaining said detent in holding position, a coöperating dog carried by said detent, a disk mounted in a frame plate and having a projecting shaft, and means for moving said shaft laterally.

14. In a releasing mechanism, a driving shaft provided with a holding projection, a spring plate adapted to engage said projection, a detent pivotally mounted upon said plate, a spring for normally retaining said detent in holding position, a coöperating dog carried by said detent, a lever device adapted to laterally shift said spring and detent, and an operating member having means disposed to engage and actuate said lever device.

15. In a releasing mechanism, a driving shaft provided with a projection, a spring plate adapted to be shifted into the path of said projection, means for shifting said plate laterally, a detent carried by said plate and adapted to be shifted into the path of said projection, and means for shifting said detent.

16. In a releasing mechanism, a driving shaft provided with a projection, a spring plate adapted to be shifted into the path of said projection, means for shifting said plate laterally, a detent carried by said plate and adapted to be shifted into the path of said projection, and means controlled from said driving shaft for automatically shifting said detent into the path of said projection.

17. In a releasing mechanism, a driving shaft provided with a projection, a spring plate adapted to be shifted into the path of said projection, means for shifting said plate laterally, a detent carried by said plate and adapted to be shifted into the path of said projection, means controlled from said driving shaft for automatically shifting said detent into the path of said projection, and means for automatically removing said detent from the path of said projection.

In testimony whereof I affix my signature in presence of two witnesses.

FERDINAND GUNDORPH.

Witnesses:
R. A. FRAME,
J. S. COURTRIGHT.